Nov. 8, 1938.  M. L. CORNELL ET AL  2,136,042
EXPANSIBLE MESH CLOSURE
Filed May 15, 1937  4 Sheets-Sheet 1

INVENTORS
Milton L. Cornell,
Emil W. Gerber,
BY Watson Bristol Johnson & Leavenworth
ATTORNEYS.

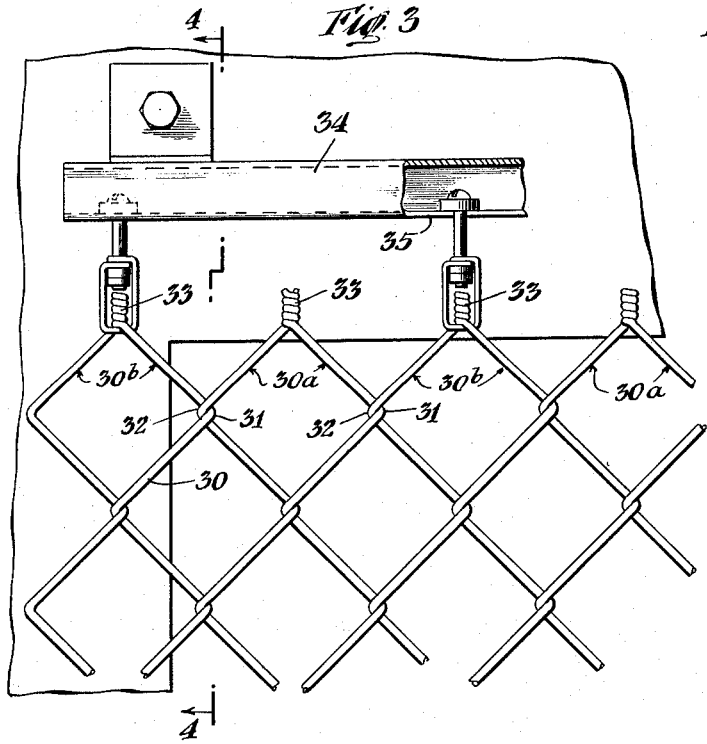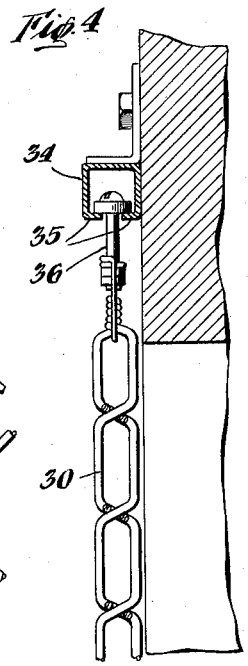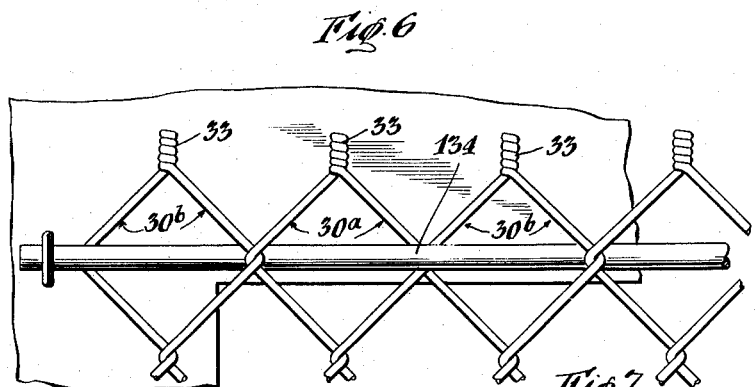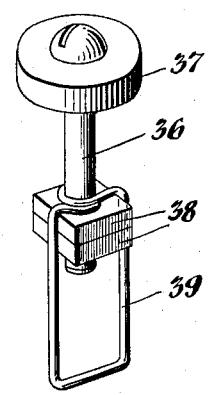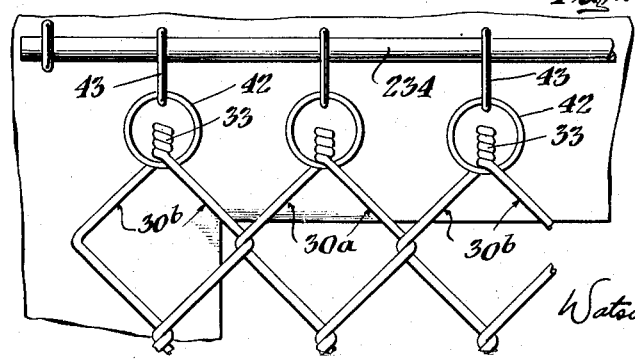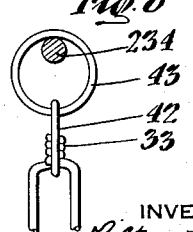

Nov. 8, 1938.   M. L. CORNELL ET AL   2,136,042
EXPANSIBLE MESH CLOSURE
Filed May 15, 1937   4 Sheets-Sheet 3
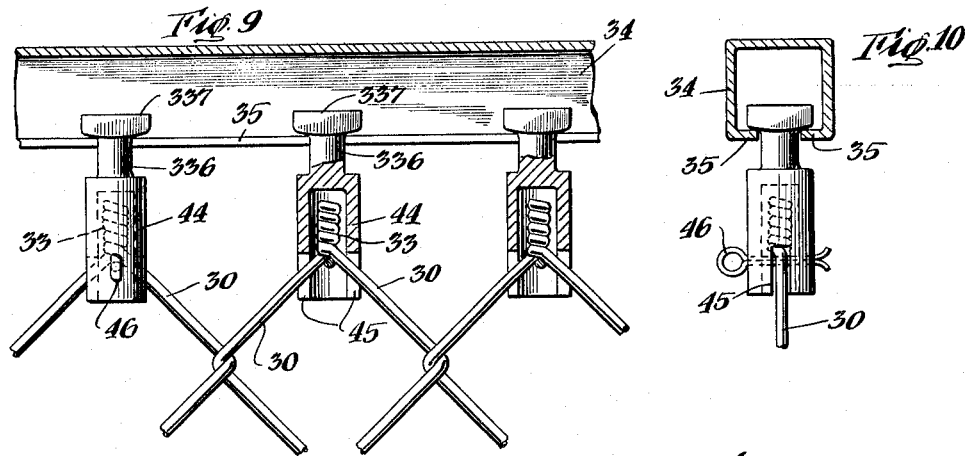
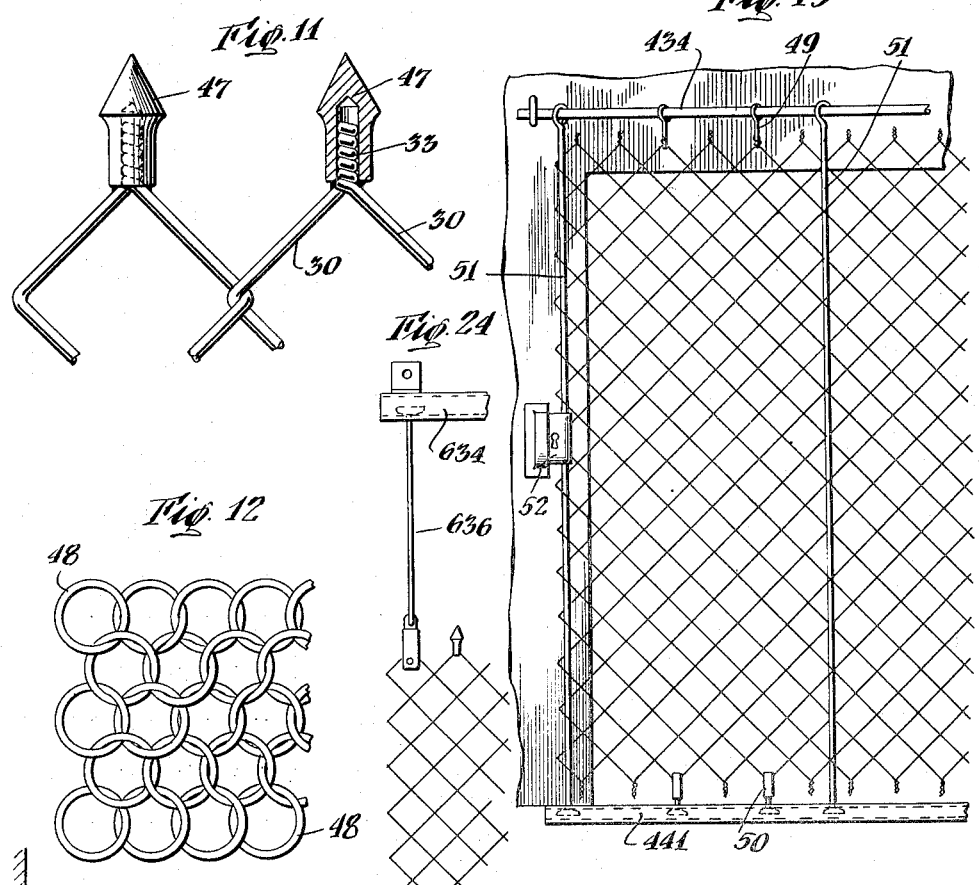
INVENTORS
Milton L. Cornell,
Emil W. Gerber,
BY
Watson Bristol Johnson & Leavenworth
ATTORNEYS.

Nov. 8, 1938.   M. L. CORNELL ET AL   2,136,042
EXPANSIBLE MESH CLOSURE
Filed May 15, 1937   4 Sheets-Sheet 4
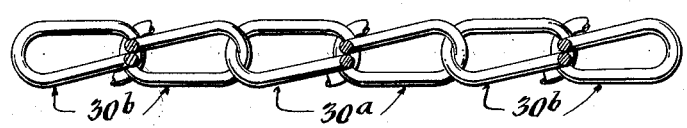
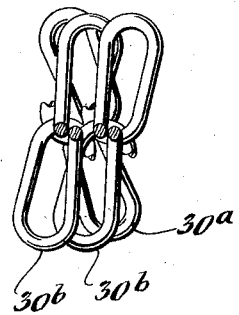
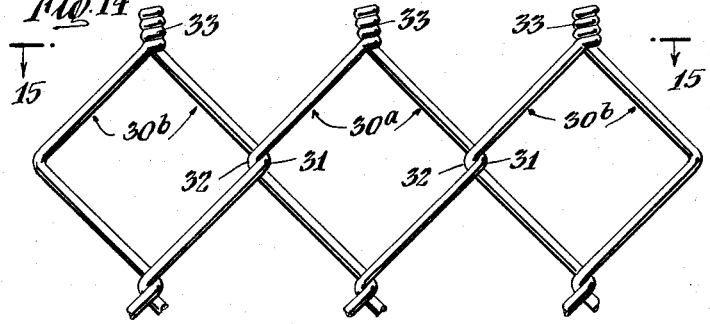
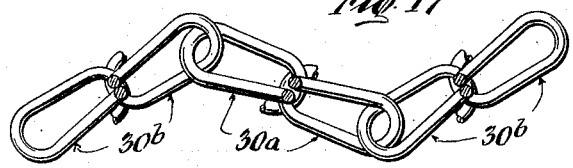
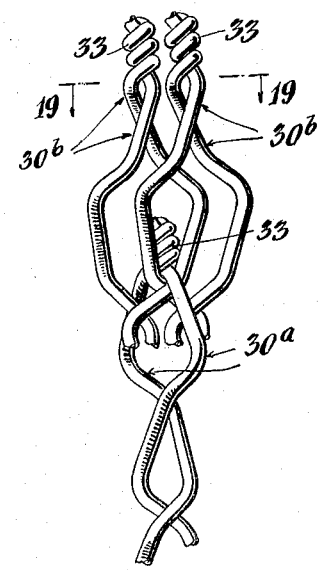
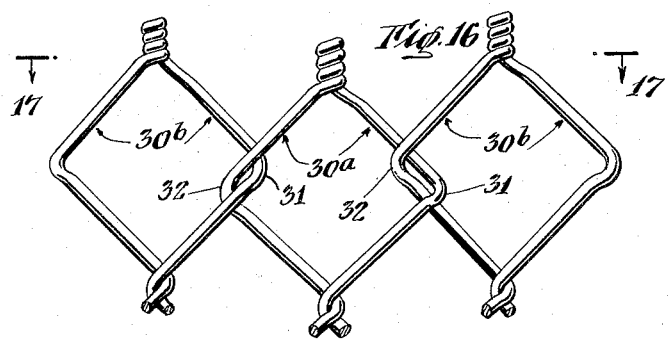
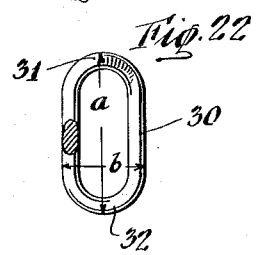
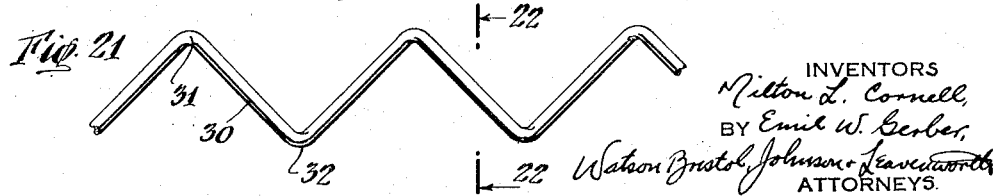
INVENTORS
Milton L. Cornell,
BY Emil W. Gerber,
Watson Bristol Johnson + Leavenworth
ATTORNEYS.

Patented Nov. 8, 1938

2,136,042

UNITED STATES PATENT OFFICE 2,136,042

EXPANSIBLE MESH CLOSURE

Milton L. Cornell, Jackson Heights, N. Y., and Emil W. Gerber, Bergenfield, N. J., assignors to Cornell Iron Works, Inc., Long Island City, N. Y., a corporation of New York Application May 15, 1937, Serial No. 142,868

14 Claims. (Cl. 39—85)

This invention relates to closures or covers for doorways, windows, and other passages or openings.

A general object of the invention is to provide such a closure having novel and extremely economical construction, whereby the benefits of useful closures are made available in many instances where heretofore the costs involved did not warrant their use, and whereby material savings can be effected in many other installations heretofore demanding more expensive equipment.

The closure of the present invention is ideally suited for use in many cases where only more complicated and expensive sliding or rolling doors, or sliding gates, were previously available. The present closure is applicable to doorways in various buildings such as factories, warehouses, garages and piers, and to other passages such as corridors, fence gates, store entrances and the like. It also is an effective closure for open windows and in addition affords a protective cover for permanently closed store show windows or show cases. It is also useful to protect the rear ends of delivery trucks. The claims covering the herein described constructions are accordingly intended to refer to and cover closures used for these or analagous purposes.

More particularly, objects of the invention are to provide a closure capable of answering any of these described purposes which is formed of collapsible or contractile mesh arranged to be selectively expanded over an opening, or gathered to one side, which is simple and inexpensive to make, and easy to install and operate.

A further object is to make inexpensive ordinary chain link fencing material available for closure purposes in a construction capable of being closed or drawn aside at will.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings; in which:

Fig. 3 is a fragmentary rear elevation, on an enlarged scale, of the upper left-hand portion of the closure shown in Fig. 1;

Fig. 4 is a fragmentary transverse sectional view taken along line 4—4 of Fig. 3;

Fig. 5 is a perspective view of one form of support element used in the closure assembly;

Fig. 6 is a fragmentary rear elevation showing another way of mounting the closure;

Fig. 7 is a fragmentary rear elevation corresponding to Fig. 6 and showing another form of mounting;

Fig. 8 is a fragmentary transverse sectional view showing the structure of Fig. 7 as viewed from the right;

Fig. 9 is a fragmentary rear elevation showing another form of mounting, parts thereof being shown in section;

Fig. 10 is a fragmentary transverse sectional view of the structure of Fig. 9 as viewed from the right;

Fig. 11 is a fragmentary detail showing a form of ornamentation which may be embodied in the present invention;

Fig. 12 is a fragmentary detail showing another form of mesh useful in certain embodiments of the invention;

Fig. 13 is a fragmentary rear elevation, on a reduced scale, of a closure embodying features of the invention including rigidifying rods;

Fig. 14 is a fragmentary rear elevation showing the upper portions of three connected pairs of strands, of the type employed in the embodiment of Fig. 1, when in fully expanded position;

Fig. 15 is a horizontal sectional view along line 15—15 of Fig. 14;

Figs. 16 and 17 are views corresponding respectively to Figs. 14 and 15 but showing the mesh strands in partially gathered position;

Figs. 18 and 19 are respectively rear elevations and horizontal sections of the strands shown in Figs. 14–16 but showing the latter in fully gathered position:

Fig. 20 is an edge view and Fig. 21 is a rear view of an individual strand of the kind employed in a closure such as that shown in Fig. 1, the strand being shown in horizontal position instead of the vertical position which it assumes in most forms of closures;

Fig. 22 is a sectional view across an individual strand, taken along line 22—22 of Fig. 21;

Fig. 23 is a fragmentary top plan view of a curved guiding track and support used in certain forms of the invention; and Fig. 24 is a fragmentary rear elevation, on a reduced scale, showing another form of enclosure embodying principles of the invention.

Figure 1:
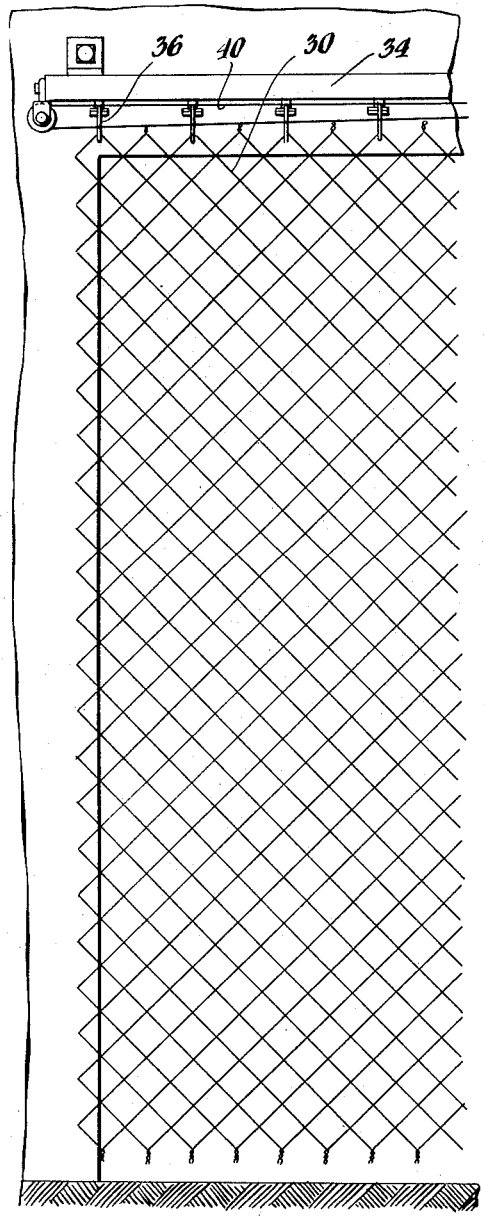
Fig. 1 is a fragmentary rear elevation showing one side of a mesh closure embodying principles of the invention.

In its preferred embodiment, the present invention utilizes commercial chain link fencing which is available on the market at a very low price as compared with flexible mesh grilles or other analogous structures heretofore employed for closing doorways or other openings. This commercial fencing is formed of a plurality of sinuous strands 30, one of which is illustrated in Figs. 20 to 22, which are coiled into the form of a partially flattened helix having a definite, somewhat elliptical section, as shown in Fig. 22, and provided with cusps or bends 31 and 32 on its opposite sides where the helical turns are made. Such fencing comes in different sizes and gauges, a preferred type being about two inches in its greater sectional dimension indicated at *a* in Fig. 22, and about three-quarter inches in its lesser sectional dimension, indicated at *b* in that figure. In forming a section of fencing these individual strands are arranged next each other with their adjacent cusps intertwined. In accordance with this invention, such strands are so interlocked and supported that they are adapted to be selectively expanded across an opening to provide a closure therefor, or to be gathered or nested together at one side of such opening. Suitable means such as a draw cord is also provided for operating the closure. While this readily available commercial chain link fencing is preferably employed in closures constructed in accordance with this invention, it will be apparent that other forms of flexible metallic mesh may be adapted at least to certain aspects of such invention, and it accordingly is to be understood that various kinds of flexible mesh material are contemplated as falling within the scope of the claims wherever the context permits.

Referring now to Figs. 1 to 5, there is shown a closure comprising a plurality of sinuous strands 30 having their adjacent cusps intertwined. As is best indicated in Fig. 3, adjacent pairs of strands are interlocked at or near their upper and lower ends, the upper ends being shown intertwisted as at 33 in that figure. These interlocked strands are not movable with respect to each other, but adjacent interlocked pairs such as that designated 30a are movably interconnected with laterally adjacent interlocked pairs of strands such as those designated 30b by their intertwined cusps 31 and 32.

A suitable support is provided for such mesh, which may preferably take the form of a hollow, channel-shaped track 34 having inturned lower flanges 35 spaced by a continuous slot. The upper portions of some or all of the interlocked strand pairs 30a or 30b are slidably suspended from such a support. One means for doing this may comprise a bolt 36 carrying a washer 37 which is adapted to rest on the guide flanges 35 and to slide therealong. Lock nuts 38 are threaded on such bolt and a wire tie 39 is passed beneath interlocked strand ends at 33 and fastened to the bolt above such nuts.

A draw cord 40 is fastened to a bolt 36, at the free edge of the mesh as shown in Fig. 1, and is passed over suitable pulleys arranged to enable the bolts and strands to be pulled together at one side of the doorway or to be drawn apart at will. For the sake of convenience such draw cord means has been illustrated only on Figs. 1 and 2, but it will be readily understood that it is applicable to the various forms of closures included in the present description.

The device as thus far described is adapted to be hung across any desired type of opening with its lower end free, and will serve to deter children or casual passers-by from entering factory premises or the like.

Figure 2:
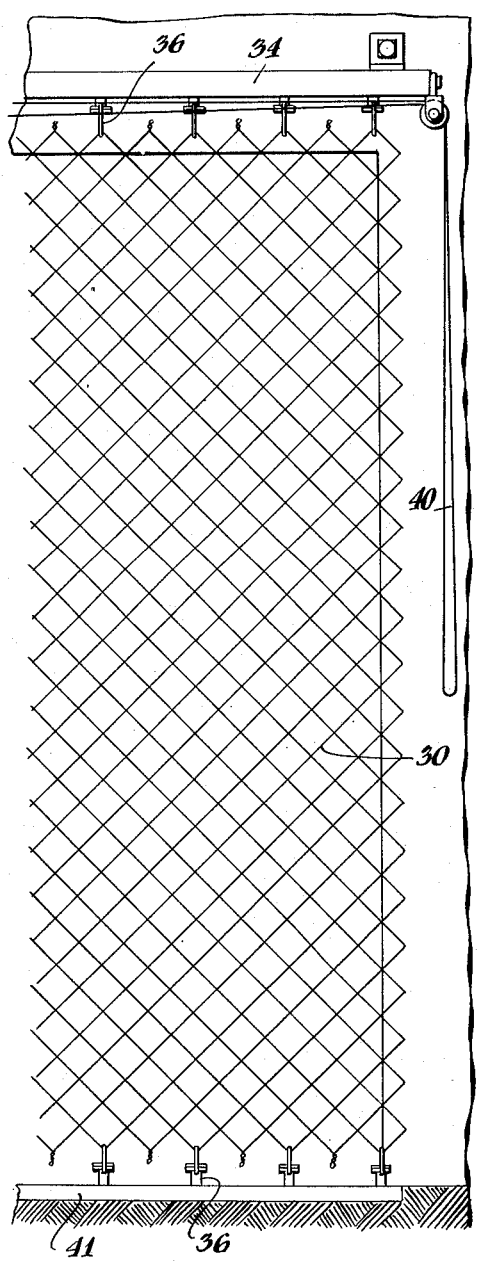
Fig. 2 is a fragmentary rear elevation showing the other side of a grille such as that shown in Fig. 1 except that it is equipped with bottom guiding and confining means.

As shown in Fig. 2, further security can be obtained by providing a bottom guide 41 which may comprise a slotted track similar to track 34, to which the lower ends of interlocked strands 30a and/or 30b may be slidably confined by means of an additional set of bolts 36 and their appurtenant parts.

Such a closure can be readily made up from a section of commercial chain link fencing of an area suitable for covering a given closure or any required portion thereof, with a minimum of manufacturing expense. It requires few appliances and these are or may be of inexpensive design. In operation, the mesh may be gathered together at one side of the closure by means of a draw string such as 40, or may be pushed aside by hand, and the individual pairs of interlocked strands nest together, preferably in a manner which will be more fully described hereinafter, into an area on the order of one sixth or less of the area of the fully extended closure.

In Fig. 6 another very simple and economical form of support is shown. Here, the intertwined pairs of strands 30a and 30b are suspended from a guide rod and support 134 which is threaded through the upper portion of the mesh preferably alternately passing above and below the uppermost row of intertwined cusps as illustrated. This enables the strand pairs to rotate as they are nested as will more clearly appear from the description of Figs. 14 to 19 hereinafter. The support 134 is suitably mounted over any desired opening and a draw string equipment may be attached to one of the twisted ends 33 to slide the mesh horizontally along its support and guide. If desired, a suitable guiding and confining means may also be provided for the lower end of the mesh. This may take the form described in connection with Fig. 2.

In Fig. 7 a plurality of interlocked strands 30a and 30b are shown slidably suspended from a guide rod and support 234 by means of pairs of interlocked split rings 42 and 43, one of which is passed beneath one of the interlocked strand ends 33 and the other slipped on the support 234. This arrangement gives the strand pairs 30a and 30b freedom to rotate or swivel with respect to the guide support as they are being drawn together into gathered position.

In Figs. 9 and 10 an arrangement similar to that of Fig. 3 is shown except that here a special casting is provided in lieu of the bolt connection 36. This casting comprises a hollow thimble 44 adapted to accommodate interlocked strand ends 33 and having its sides notched at 45 to accommodate the individual strands 30. A cotter pin 46 holds the interlocked ends of these strands within the thimble 44. The latter has an upwardly projecting neck 336 which terminates in an enlarged head 337 which is adapted to rest upon and slide along flanges 35 of a hollow guide and support 34. A mesh closure supported in this manner is adapted to be operated in the same way as the previously described forms. The described connection 44 may also be employed at the bottom of the mesh, when desired.

In Fig. 11, there is shown an illustrative ornamental cap 47 adapted to be placed over the interlocked ends 33 of the adjacent strands 30. This cap may take any suitable configuration, and may be formed of plastic or bendable sheet metal material, wood, composition, or the like. It is especially well adapted to be applied to installations such as that shown in Fig. 6 where the strand ends 33 project beyond the guide support. If this type of mounting is used as a window covering or the like, both its upper and lower ends may be guided by rods such as 134, in which case the ornamental caps 47 may be applied to both the top and bottom of the mesh.

It is also intended that expansible mesh of the kind herein contemplated may be mounted with its individual strands extending horizontally rather than vertically so that the mesh can be raised and lowered between expanded and gathered position. Such an installation may be guided at either side by means of a rod such as 134 threaded through its lateral edges and in such case the laterally projecting strand ends 33 may be covered with a suitable ornamental cap 47. Such cap may, in fact, be applied to cover raw ends or edges wherever they occur, provided the structure is otherwise amenable to their use.

In Fig. 12, a section of another form of flexible mesh is shown comprising a plurality of intertwined metallic rings 48. This is illustrative of one of several kinds of flexible metal meshes which may be employed in the manner taught by the present invention. Such mesh may be guided at its upper and lower edges by means of supports such as those shown in Figs. 5, 6 or 7, or other suitable supports, and may be operated by a suitable draw cord when desired. Preferably, however, a mesh composed of continuous sinuous strands having adjacent cusps which can be intertwined is employed. Preferably, also, such strands are interlocked into pairs, as described, although it will be understood that they may be assembled and mounted in various ways. For example, each individual strand may be slidably supported from its guide.

In Fig. 13, a closure which is preferably formed of mesh like that shown in Fig. 3, is slidably mounted across a door opening with some or all of its interlocked strand pairs suspended from an upper guide and support 434 by means of suitable connections designated 49 which may be in the form of the rings 42 and 43 shown in Fig. 7, or other suitable forms. The lower end of the mesh is preferably confined and guided in a guide 441 by means of suitable connections designated 50 which may be of the forms shown in Figs. 5 or 9, or of other suitable forms. This closure is rigidified by vertical rods 51 which are passed entirely through any selected helical strand. Each rod 51 has its ends slidably confined by the guides 434 and 441, the rods being spaced at suitable intervals across the closure. If desired, a lock 52 may be mounted on such closure, which will preferably have a rigidifying rod 51 passing through its edge strand. This form of device can be mounted for either horizontal sliding movement, or for vertical sliding movement (not shown) and is adapted to be operated by suitable means such as a draw cord. When pulled into gathered position at one side of the door opening the rigidifying rods are drawn together along with the rest of the intertwined mesh structure.

While the several pairs of interlocked strands 30a and 30b are adapted to be suspended in any suitable manner, in accordance with one important aspect of the invention, they are especially arranged to assume a very compact nested relation when gathered to one side. In accordance with this aspect of the invention, only alternate pairs of strands, such as those indicated, for example, at 30b in Fig. 3 are suspended from the upper guide and support, and the means for suspending them is arranged to permit rotation or swiveling of the interlocked strand pair with respect to such support. When thus hung, the strands gather together in the compact manner illustrated in Figs. 14 to 19 inclusive. In Fig. 14, the uppermost sections of three adjacent strand pairs are shown among which the interlocked ends 33 of the alternate strand pairs 30b are the ones slidably and rotatably hung from a suitable guide such as track 34. The intervening strand pair 30a is not connected to any support or guide. When pulled to their extended position, these strand pairs assume the position shown in Figs. 14 and 15 with their intertwined cusps 31 and 32 drawn tightly against each other. When the draw string is operated to urge the supported strand pairs 30b toward each other, as shown in Figs. 16 and 17, the intervening strand 30a begins to drop vertically with respect to such supported strands with its cusps 31 and 32 sliding downwardly away from the corresponding cusps of the supported strand pairs. This downward sliding movement of the free strand pair 30a imparts a rotary movement to each of the intertwined strand pairs involved. The weight of the free pair 30a tends to cause strands 30b to twist in a counterclockwise direction as viewed in Fig. 17, with a consequent clockwise rotation of the free strand 30a. In Figs. 18 and 19 these strand pairs are shown in fully nested position. Here the supported strand pairs 30b are twisted in a counterclockwise direction with their greater sectional dimension extending in a direction almost 90° from that which they occupied in the extended condition of the mesh, while the strand pair 30a is turned in a clockwise direction with its greater dimension extending almost 90° from the position it occupied in the extended condition of the mesh. The strand pair 30a has also dropped down until its interlocked ends 33 reach the position indicated in Fig. 18, at which time the supported strands 30b are in close nesting engagement with each other. The non-supported strand pairs 30a across the mesh also assume a close engaging position so that the several strands comprising the entire mesh are efficiently nested with their smaller sectional dimension extending in the plane of the door opening and with alternate pairs of strands staggered vertically for greater compactness.

A somewhat similar compacting action will obtain if only every third or every fourth set of interlocked strand pairs is rotatably supported with the intervening strand pairs left free, and such an arrangement is contemplated as being within the purview of the invention. Preferred results both as to compact nesting and adequate support are provided, however, by slidably and rotatably suspending alternate interlocked strand pairs, since this has the desired effect of swinging each strand pair from the position in which its greater dimension extends in the plane of the door opening to a position in which its lesser dimension extends in such plane, thus encroaching to a minimum extent on the door opening when the closure is in contracted position.

In Fig. 23 another arrangement for avoiding encroachment upon the opening is indicated. Here the upper support 534 may be in the form of a hollow track generally similar to support 34 except that it is curved at one or both ends to provide an end portion 53 which is adapted to be mounted closely adjacent a corridor wall, door jamb or the like. With this arrangement the flexible mesh is adapted to be gathered into the end portion 53 where it is out of the way.

In some corridors or high openings, a close mesh closure may only be required over a portion of the vertical extent of the passageway, say to shoulder height. A closure for such purpose is shown in Fig. 24, where a contractile wire mesh is provided which extends from the floor to a required height. Its lower edge may be suitably guided and slidably confined in the manner shown in Fig. 2. Its upper edge is suspended from a guide and support 634 by means of elongate connecting bolts or rods 636, which may be attached to alternate or otherwise suitably spaced strands, giving a relatively open effect to the upper closure structure, and reducing the materials and cost.

It will be seen that all of the described embodiments of the invention are subject to easy and inexpensive manufacture, are readily adapted to be installed in any given type of passage, and are otherwise well adapted to fulfill the intended object of the invention.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A closure for door, gate or like openings, comprising a section of commercial chain link fencing of a size adapted to cover a desired area of the opening, said fencing having sinuous cusped vertical strands with their adjacent cusps intertwined among which adjacent strands are locked together in pairs and adjacent locked pairs of strands are movably interconnected by their intertwined cusps, a support extending across the upper part of such opening, means slidably and rotatably suspending said locked pairs of strands from said support, and means for sliding said strands along said support.

2. A closure for door, gate, or like openings comprising a plurality of sinuous cusped vertical strands having their adjacent cusps intertwined, adjacent strands being interlocked in pairs adjacent their upper and lower ends, a strand of each of two adjacent interlocked pairs of strands being movably interconnected by their intertwined cusps, a support extending across such opening, and means slidably suspending said interlocked pairs of strands from said support with a rotatable connection enabling them to rotate through approximately a right angle, and means for sliding said strands along said support.

3. A closure for door, gate, or like openings, comprising a plurality of sinuous cusped vertical strands having their adjacent cusps intertwined, adjacent strands being interlocked in pairs, the adjacent interlocked pairs of strands being movably interconnected by their intertwined cusps, a support extending across such opening, swivel means slidably suspending selected interlocked pairs of strands from said support, said suspended pairs being spaced from each other by other interlocked pairs of strands capable of dropping between the suspended pairs when the closure is not extended, and means for sliding said suspended strands along said support from open to closed position.

4. A closure for door, gate, or like openings, comprising a plurality of sinuous cusped vertical strands having their adjacent cusps intertwined, adjacent strands being interlocked in pairs, adjacent interlocked pairs of strands being movably interconnected by their intertwined cusps, a support extending across such opening, swivel means slidably suspending alternate interlocked pairs of strands from said support whereby the intervening non-supported interlocked pairs of strands may drop between the supported pairs when the closure is not extended, and means for sliding said suspended strands along said support from open to closed position.

5. A closure for door, gate, or like openings, comprising a plurality of sinuous cusped vertical strands having their adjacent cusps intertwined, adjacent strands being interlocked in pairs, adjacent interlocked pairs of strands being movably interconnected by their intertwined cusps, a support extending above, and a guide extending beneath such opening, swivel means slidably suspending alternate interlocked pairs of strands from said support, and swivel means slidably connecting the lower ends of said suspended pairs of strands with said guide, whereby the intervening non-supported interlocked pairs of strands may drop between and rotate with respect to the supported pairs when the closure is not extended.

6. A closure for door, gate or like openings comprising a section of commercial chain link fencing of a size adapted to cover a desired area of the opening, said fencing having sinuous cusped vertical strands with their adjacent cusps intertwined among which adjacent strands are locked together in pairs near their upper and lower ends and adjacent locked pairs of strands are movably interconnected by their intertwined cusps, a combined support and guide extending above said opening, a lower guide extending beneath such opening, swivel means slidably and rotatably suspending selected locked pairs of strands from said combined support and guide, said suspended pairs being spaced from each other by other locked pairs of strands capable of dropping between and rotating with respect to the supported pairs when the closure is not extended, and additional swivel means slidably and rotatably connecting the lower portions of said suspended pairs with said lower guide.

7. A closure for door, gate, or like openings, comprising a flexible open mesh of intertwined metallic elements arranged selectively to be gathered together or to be extended, a combined support and guide extending above such opening and slidably suspending said mesh, a guide extending beneath such opening and confining the lower portion of said mesh to movement therealong, vertical rigidifying rods interlaced with said mesh at spaced intervals and each having its ends respectively slidably confined by said upper and lower guides.

8. A closure for door, gate or like openings, comprising mesh of substantial width formed of a plurality of helically wound vertically extending strands each intertwined with a laterally adjacent strand, a support and guide above such opening, a guide below such opening, means slidably suspending the upper portions of said mesh from said upper support, means slidably connecting lower portions of said mesh with said lower guide, and a vertical rigidifying rod passing through at least one of said helically wound strands positioned between the edges of said mesh and having its ends slidably confined by said guides.

9. A closure for door, gate, or like openings comprising a mesh formed of a plurality of partially flattened helices each extending in a generally vertical direction and having its coils intertwined with coils of a laterally adjacent strand, adjacent strands being interlocked in pairs, adjacent interlocked pairs of strands being movably interconnected by their intertwined coils, a support extending across such opening, means slidably and rotatably connecting selected interlocked pairs of strands with said support, and means for selectively extending said strands across such opening with their greater sectional dimension substantially in the plane of the opening and for gathering said strands together with their lesser sectional dimension substantially in the plane of the opening.

10. A closure for door, gate or like openings comprising a mesh formed of a plurality of sinuous cusped strands having their adjacent cusps intertwined, adjacent strands being interlocked in pairs adjacent their ends and adjacent interlocked pairs of strands being movably interconnected by their intertwined cusps, opposed guide means extending along two opposite sides of such an opening, at least some among said interlocked pairs having their end portions respectively slidably and rotatably mounted on said opposed guide means whereby said interlocked pairs may rotate with respect to each other when not in extended condition, and means for selectively extending said strands across said opening or gathering them together in nested condition.

11. A closure for door, gate, or like openings comprising mesh formed of a plurality of helically wound wire strands each having its coils intertwined with an adjacent strand, adjacent strands being interlocked in pairs at their ends, the adjacent interlocked pairs of strands being movably interconnected by their intertwined coils, a guide rod threaded through said interlocked pairs of coils near their interlocked ends whereby such ends project outwardly beyond said rod, ornamental caps covering at least some of said projecting ends, said interlocked pairs of coils being slidable along said rod between open and closed positions.

12. A closure for door, passage, or like openings, comprising a section of commercial chain link fencing of a size adapted to cover a desired area of the opening, said fencing having sinuous cusped vertical strands with their adjacent cusps intertwined among which adjacent strands are locked together in pairs and adjacent locked pairs of strands are movably interconnected by their intertwined cusps, a guide and support having its main portion spanning such opening and having an end portion arranged at an angle to such main portion, and swivel means slidably and rotatably suspending locked pairs of strands from said support for rotation with respect to each other when changing from gathered to extended position and vice versa, said mesh being adapted to be contracted beneath said end portion of the support when not in use.

13. A closure for door, gate, or like openings, comprising an expansible and contractile wire mesh adapted selectively to be extended across a given opening and to be contracted into a smaller area at one side thereof, said mesh extending vertically only part way up such opening, guide means slidably confining the lower edge of said mesh as it is extended and contracted, an upper guide and support extending above said opening, and elongate spaced connections slidably connecting the upper edge of said mesh with said upper guide and support.

14. A closure for door, gate or like openings comprising mesh formed of a plurality of helically wound wire strands each having its coils intertwined with those of an adjacent strand, adjacent strands being interlocked in pairs at their ends and adjacent interlocked pairs of strands being movably interconnected by their intertwined coils, a guide rod threaded through said interlocked pairs of strands near their interlocked ends and arranged to have said interlocked pairs slide therealong and also rotate with respect to each other for movement from extended to nested positions.

MILTON L. CORNELL.
EMIL W. GERBER.